(12) United States Patent
Chiou

(10) Patent No.: US 12,464,661 B2
(45) Date of Patent: Nov. 4, 2025

(54) FOLDABLE ELECTRONIC DEVICE

(71) Applicant: ASUSTEK COMPUTER INC., Taipei (TW)

(72) Inventor: Ing-Jer Chiou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 212 days.

(21) Appl. No.: 18/302,350

(22) Filed: Apr. 18, 2023

(65) Prior Publication Data

US 2024/0268043 A1 Aug. 8, 2024

(30) Foreign Application Priority Data

Feb. 7, 2023 (TW) ................................ 112104180

(51) Int. Cl.
*H05K 5/02* (2006.01)

(52) U.S. Cl.
CPC ................................ *H05K 5/0217* (2013.01)

(58) Field of Classification Search
CPC .. H05K 5/0217; H05K 5/0234; H05K 5/0226; G06F 1/1616; G06F 1/1618; G06F 1/1681
See application file for complete search history.

(56) References Cited

U.S. PATENT DOCUMENTS

| | | | | |
|---|---|---|---|---|
| 5,375,076 A * | 12/1994 | Goodrich | ............. | G06F 1/1669 |
| | | | | D14/327 |
| 6,256,192 B1 * | 7/2001 | Shannon | ................. | G06F 1/203 |
| | | | | 361/679.41 |
| 7,551,426 B2 * | 6/2009 | Huang | .................. | G06F 1/1632 |
| | | | | 361/679.02 |
| 8,203,832 B2 * | 6/2012 | Szabolcsi | ............. | G06F 1/1649 |
| | | | | 361/679.04 |
| 9,715,251 B2 * | 7/2017 | Chung | .................... | G06F 1/162 |
| 9,765,922 B2 * | 9/2017 | Dai | ........................ | F16M 13/02 |
| 10,344,797 B2 * | 7/2019 | Park | ....................... | G06F 1/1681 |
| 11,353,925 B2 * | 6/2022 | Lin | ......................... | G06F 1/162 |
| 11,650,631 B2 * | 5/2023 | Watamura | .............. | F16M 11/10 |
| | | | | 361/679.26 |

(Continued)

FOREIGN PATENT DOCUMENTS

CN 101694594 A 4/2010
CN 102253693 A 11/2011

(Continued)

OTHER PUBLICATIONS

Office Action dated Nov. 7, 2023 issued in corresponding Taiwan Application No. 112104180.

*Primary Examiner* — Sagar Shrestha
(74) *Attorney, Agent, or Firm* — MUNCY, GEISSLER, OLDS & LOWE, P.C.

(57) ABSTRACT

A foldable electronic device is provided, including a first body and a second body. The first body includes a front surface and a rear surface. The second body is arranged at the rear surface and includes a support portion. A system is arranged in the support portion. The support portion is used for being switched between a folded position and a supporting position. When the support portion is located at the folded position, the support portion abuts against the rear surface. When the support portion is located at the supporting position, an open space is formed between the support portion and the rear surface.

9 Claims, 6 Drawing Sheets

(56) References Cited

U.S. PATENT DOCUMENTS

| | | | | |
|---|---|---|---|---|
| 2003/0142469 A1* | 7/2003 | Ponx | G06F 1/1679 | 361/679.04 |
| 2005/0052831 A1* | 3/2005 | Chen | G06F 1/1683 | 361/679.11 |
| 2013/0088431 A1* | 4/2013 | Ballagas | G09G 5/00 | 345/168 |
| 2014/0063712 A1* | 3/2014 | Chung | G06F 1/1615 | 361/679.09 |
| 2014/0160654 A1* | 6/2014 | Yoo | G06F 1/1637 | 361/679.12 |
| 2014/0293534 A1* | 10/2014 | Siddiqui | G06F 1/1637 | 248/688 |
| 2014/0321038 A1* | 10/2014 | Park | G06F 1/1681 | 361/679.09 |
| 2015/0022961 A1* | 1/2015 | Jenkins | F16M 13/005 | 248/688 |
| 2015/0185866 A1* | 7/2015 | Im | G06F 1/1677 | 345/168 |
| 2015/0282354 A1* | 10/2015 | Spollen | G06F 1/1616 | 206/45.2 |
| 2016/0081208 A1* | 3/2016 | Dai | F16M 13/02 | 361/679.01 |
| 2017/0292302 A1* | 10/2017 | Tomky | F16M 13/005 | |
| 2017/0351298 A1* | 12/2017 | Li | G06F 1/1616 | |
| 2017/0351299 A1* | 12/2017 | Li | A45C 13/005 | |
| 2023/0100165 A1* | 3/2023 | Tsai | G06F 1/203 | 361/679.02 |

FOREIGN PATENT DOCUMENTS

| | | |
|---|---|---|
| CN | 103186181 A | 7/2013 |
| CN | 212873934 U | 4/2021 |
| TW | 201033789 A | 9/2010 |
| TW | M482773 U | 7/2014 |

* cited by examiner

FOLDABLE ELECTRONIC DEVICE

CROSS-REFERENCE TO RELATED APPLICATION

This application claims the priority benefit of Taiwan Application Serial No. 112104180, filed on Feb. 7, 2023. The entirety of the above-mentioned patent application is hereby incorporated by reference herein and made a part of the specification.

BACKGROUND OF THE INVENTION

Field of the Invention

The disclosure relates to an electronic device, and more particularly, to a foldable electronic device with a support.

Description of the Related Art

Due to the limitation of a size of an internal space of a housing, a conventional foldable electronic device, such as a notebook computer, easily has following problems: a system is poor in heat dissipation, a part or the housing has a high surface temperature, and the like.

BRIEF SUMMARY OF THE INVENTION

The disclosure provides a foldable electronic device, including a first body and a second body. The first body includes a front surface and a rear surface. The second body is arranged at the rear surface and includes a support portion. A system is arranged in the support portion. The support portion is used for being switched between a folded position and a supporting position. When the support portion is located at the folded position, the support portion abuts against the rear surface. When the support portion is located at the supporting position, an open space is formed between the support portion and the rear surface.

When the foldable electronic device of the disclosure is in use, the support portion is moved to the supporting position, so that an open space is formed between the support portion and the first body, facilitating introduction of cold air into a system for heat dissipation. This not only improves the heat dissipation ability of the system and reduces noise generated by a heat dissipation fan, but also helps improve the efficiency of the system.

DETAILED DESCRIPTION OF THE EMBODIMENTS

Specific embodiments of the disclosure will be described in more details below in combination with the schematic diagrams. Advantages and features of the disclosure will become clearer from the following descriptions and claims. It should be noted that the drawings are in extremely simple form and non-precise proportions and are presented for convenience and clarity only to assist in describing the embodiments of the disclosure.

Figure 1:
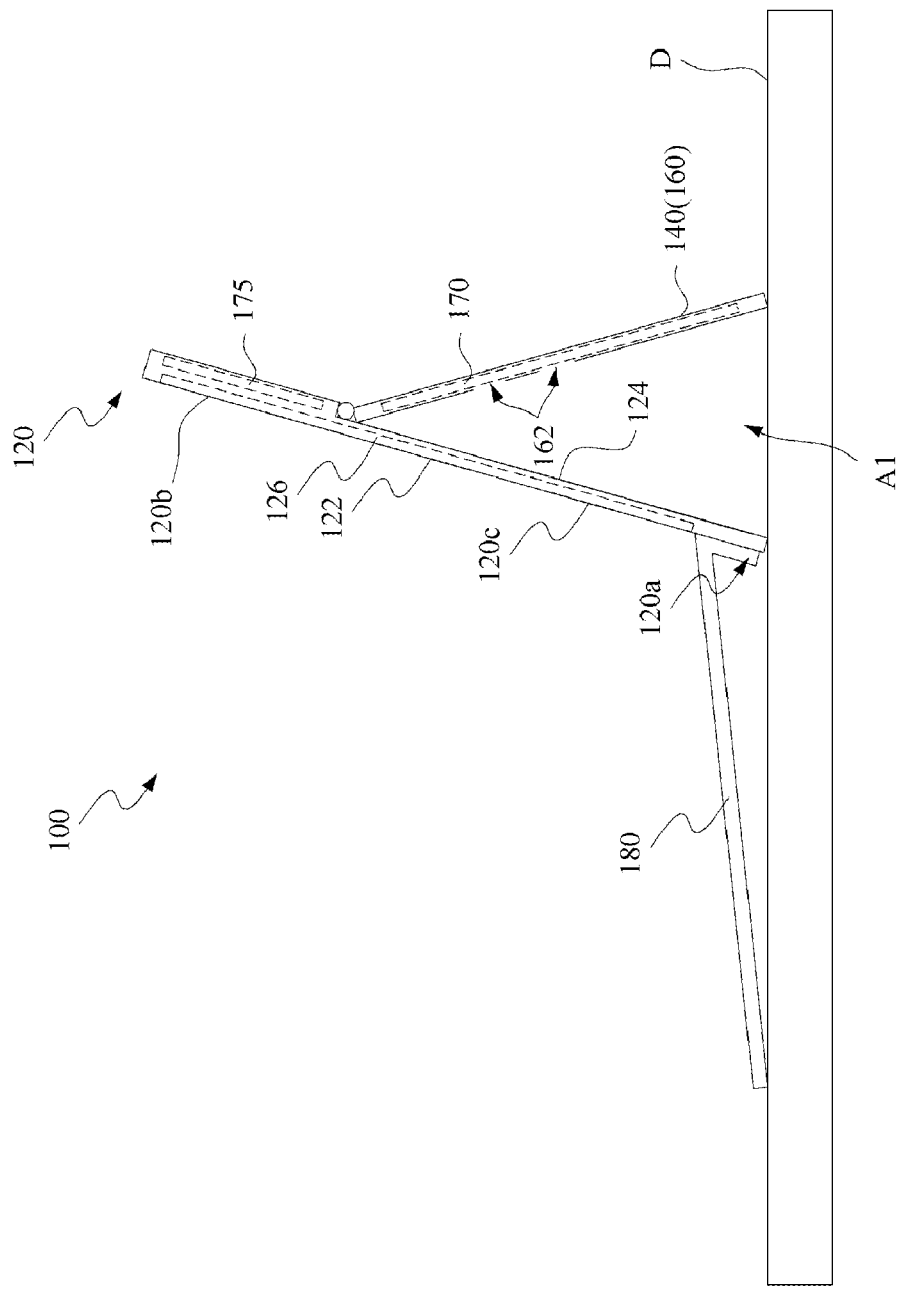
FIG. 1 and FIG. 2 are schematic diagrams of an unfolded state and a folded state of a foldable electronic device provided according to a first embodiment of the disclosure.
Figure 2:
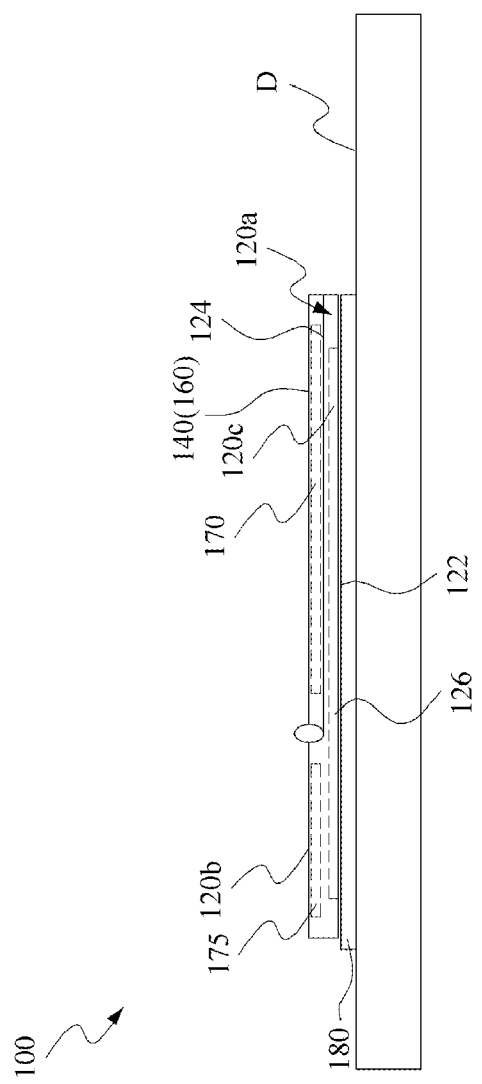

FIG. 1 and FIG. 2 are schematic diagrams of an unfolded state and a folded state of a foldable electronic device 100 provided according to a first embodiment of the disclosure. This figure shows a side view of the foldable electronic device 100. As shown in the figure, the foldable electronic device 100 is placed on a placement surface D.

As shown in the figure, the foldable electronic device 100 includes a first body 120 and a second body 140.

The first body 120 includes a front surface 122 and a rear surface 124, and includes a screen module 126. The front surface 122 of the first body 120 is a surface of the screen module 126 used for displaying a picture.

In one embodiment, the first body 120 further includes a touch-control module (not shown). The touch-control module is arranged in a display area of the screen module 126 to provide a touch-control input function.

The second body 140 is arranged at the rear surface 124 of the first body 120 as a support portion 160 to support the first body 120.

A system 170 is arranged in the support portion 160. The system 170 controls, in a wired or wireless manner, the first body 120 to perform displaying. The support portion 160 is switched between a folded position (corresponding to FIG. 2) and a supporting position (corresponding to FIG. 1). When the support portion 160 is located at the folded position, the support portion 160 abuts against the rear surface 124 of the first body 120. When the support portion 160 is located at the supporting position, an open space A1 is formed between the support portion 160 and the rear surface 124 to facilitate heat dissipation performed by the system 170.

In the foldable electronic device 100 of the disclosure, the system 170 is arranged at the support portion 160 to help reduce thicknesses of other components (such as the first body 120) of the foldable electronic device 100.

A lower edge 120a of the first body 120 is connected to an input module 180 according to an actual need. The input module 180 is detachably connected to the lower edge 120a of the first body 120 and is electrically connected to the first body 120. The input module 180 includes a keyboard and a touchpad for a user to operate. In one embodiment, the input module 180 is detachably connected to the lower edge 120a of the first body 120 through magnetic attraction.

In one embodiment, the system 170 includes a motherboard (not shown) and an input/output port module (not shown). A connector slot of the input/output port module is formed in a side surface of the support portion 160. In addition, in other embodiments, a battery 175 is arranged in the support portion 160 if there is a sufficient space in the support portion 160.

The first body 120 of this embodiment includes an upper portion 120b and a lower portion 120c, and a thickness of the upper portion 120b is greater than that of the lower portion 120c. The battery 175 is arranged in an extra thickness space of the upper portion 120b. The battery 175 supplies power to the screen module 126 of the first body 120 and the system 170 in the support portion 160. The support portion 160 is pivotally connected to an intersection of the upper portion 120b and the lower portion 120c.

When the foldable electronic device 100 is in the folded state, the first body 120 is overlapped with the input module 180 in a manner that the front surface 122 faces downward, and the support portion 160 abuts against an area, corresponding to the lower portion 120c, of the rear surface 124 of the first body 120. Since an outer side surface of the support portion 160 is flush with an area, corresponding to the upper portion 120b, of the rear surface 124, the foldable electronic device 100 exhibits a simple appearance as a whole.

When the foldable electronic device 100 is in the unfolded state, the input module 180 is unfolded forward from the front surface 122 of the first body 120, and the support portion 160 is unfolded outward from the rear surface 124 of the first body 120 to the supporting position, so that the first body 120 is in a desired oblique angle. This oblique angle is determined by an angle at which the support portion 160 is unfolded outward from the rear surface 124 of the first body 120.

In one embodiment, the upper portion 120b of the first body 120 is used to limit a range of an unfolding angle of the support portion 160. In other embodiments, a torsion rotating shaft is used to connect the support portion 160 to the first body 120. The torsion rotating shaft provides a resistance to fix the support portion 160. In this way, the user fixes the support portion 160 at a desired angle according to a need.

In one embodiment, a housing of the support portion 160 includes a plurality of heat dissipation holes 162 at a surface facing the first body 120, to dissipate heat from the system 170 in the support portion 160. In addition, in order to further improve the heat dissipation efficiency of the support portion 160, the side surface of the support portion 160 is provided with heat dissipation holes 162 resisting against a lower edge of the placement surface or adjacent to an upper edge of the first body 120.

When the foldable electronic device 100 is in the folded state (namely, usually a standby or turned-off state), the support portion 160 abuts against the area, corresponding to the lower portion 120c, of the rear surface 124, so that the heat dissipation holes 162 are hidden. In this way, the foldable electronic device 100 exhibits a simple and complete appearance as a whole.

When the foldable electronic device 100 is in the unfolded state (namely, usually a running state), the support portion 160 is unfolded outward from the rear surface 124 of the first body 120 to the supporting position, so that the heat dissipation holes 162 are exposed. At this time, a heat dissipation channel is formed between the support portion 160 and the first body 120 to facilitate heat dissipation of the system 170 in the support portion 160.

Figure 3:
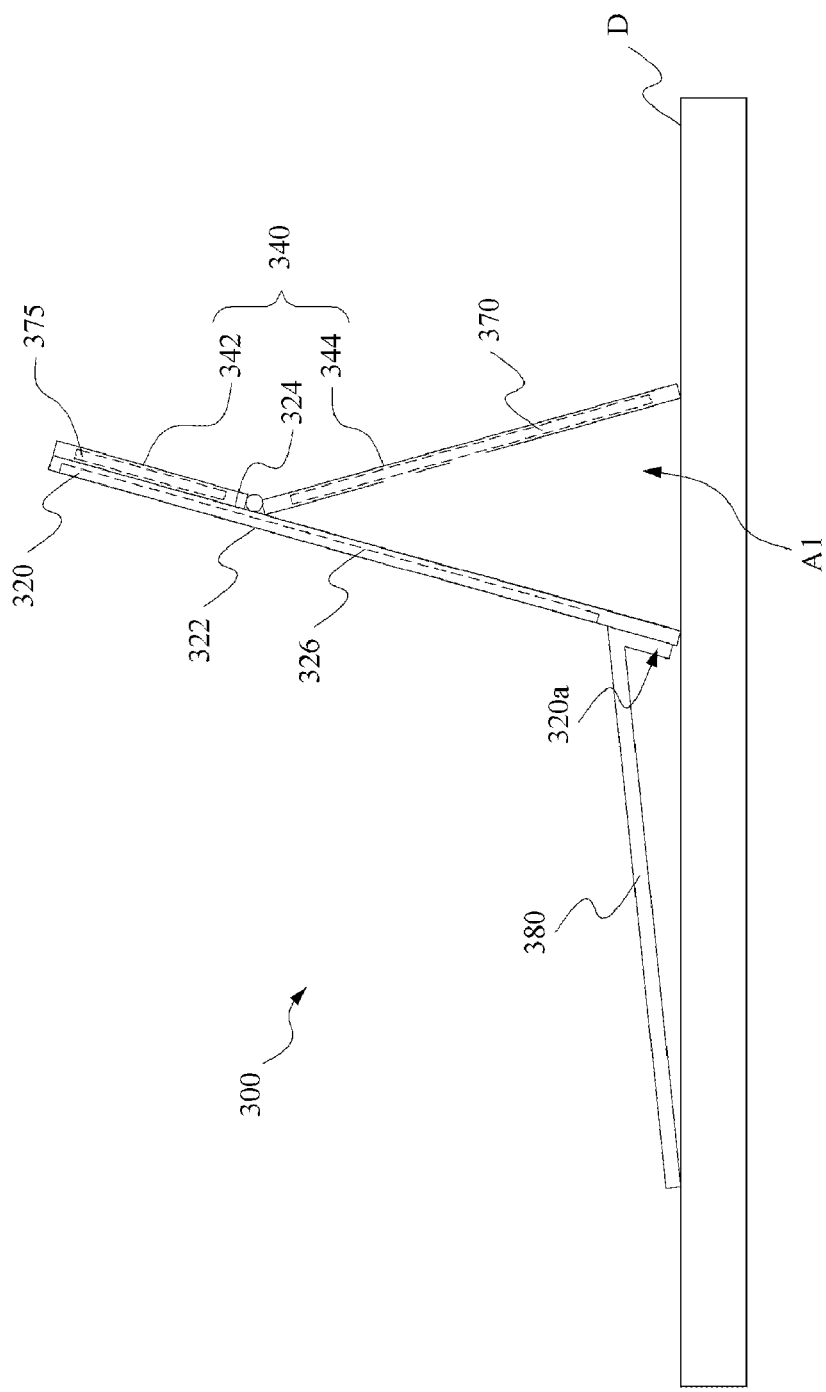
FIG. 3 and FIG. 4 are schematic diagrams of an unfolded state and a folded state of a foldable electronic device provided according to a second embodiment of the disclosure.
Figure 4:
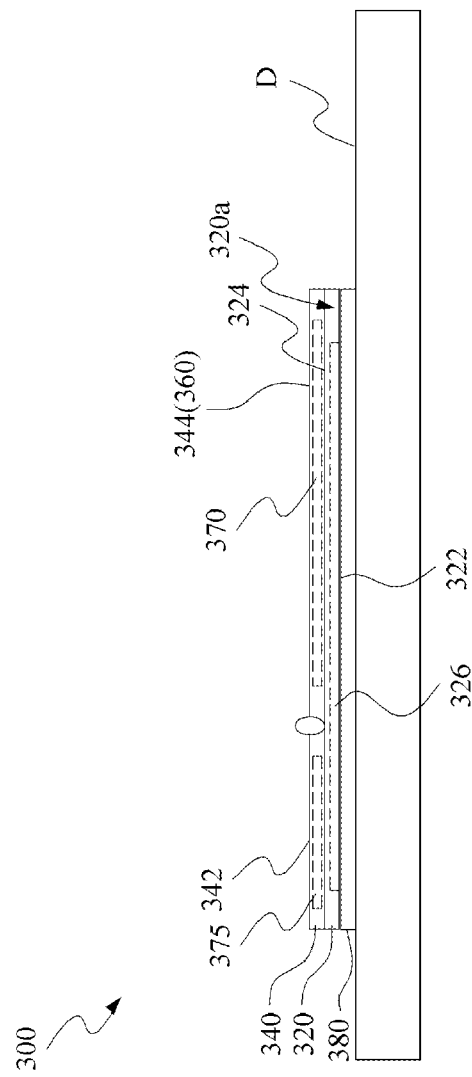

FIG. 3 and FIG. 4 are schematic diagrams of an unfolded state and a folded state of a foldable electronic device 300 provided according to a second embodiment of the disclosure.

Compared to that of the first embodiment, a first body 320 of this embodiment is of a plate-like structure with a uniform thickness. The first body 320 includes a front surface 322 and a rear surface 324, and includes a screen module 326. The front surface 322 of the first body 320 is a surface of the screen module 326 used for displaying a picture.

A second body 340 includes a connecting portion 342 and a support portion 344. A connector (not shown) is arranged on one side of the connecting portion 342 facing the second body 340. The second body 340 communicates with the first body 320 through the connector and transmits electric energy. The connecting portion 342 faces one side of the second body 340 and includes a magnetic attraction element (not shown), so that the connecting portion 342 is detachably fixed to the rear surface 324 of the first body 320. The support portion 344 is pivotally connected to the connecting portion 342.

The system 370 of this embodiment is arranged in the support portion 344, and a battery 375 is arranged in the connecting portion 342. The system 370 controls, via the connecting portion 342, a screen module 326 in the first body 320 to perform displaying. The battery 375 supplies power to the system 370 in the support portion 344 and the screen module 326 in the first body 320 in a wired manner. A lower edge 320a of the first body 320 is connected to an input module 380 according to an actual need.

When the foldable electronic device 300 is in the folded state, the first body 320 is overlapped with the input module 380 in a manner that the front surface 322 faces downward, and the support portion 344 abuts against the rear surface 324 of the first body 320. Since a thickness of the support portion 344 is substantially the same as a thickness of the connecting portion 342, the foldable electronic device 300 exhibits a simple appearance as a whole.

When the foldable electronic device 300 is in the unfolded state, the input module 380 is unfolded forward from the front surface 322 of the first body 320, and the support portion 344 is unfolded outward from the rear surface 324 of the first body 320 to the supporting position, so that the first body 320 is in a desired oblique angle. This oblique angle is determined by an angle at which the support portion 344 is unfolded outward from the rear surface 324 of the first body 320.

In one embodiment, a maximum angle at which the support portion 344 is unfolded outward from the rear surface 324 of the first body 320 is limited by a pivoting structure between the support portion 344 and the connecting portion 342, or is limited directly by using an external structure of the connecting portion 342.

Figure 5:
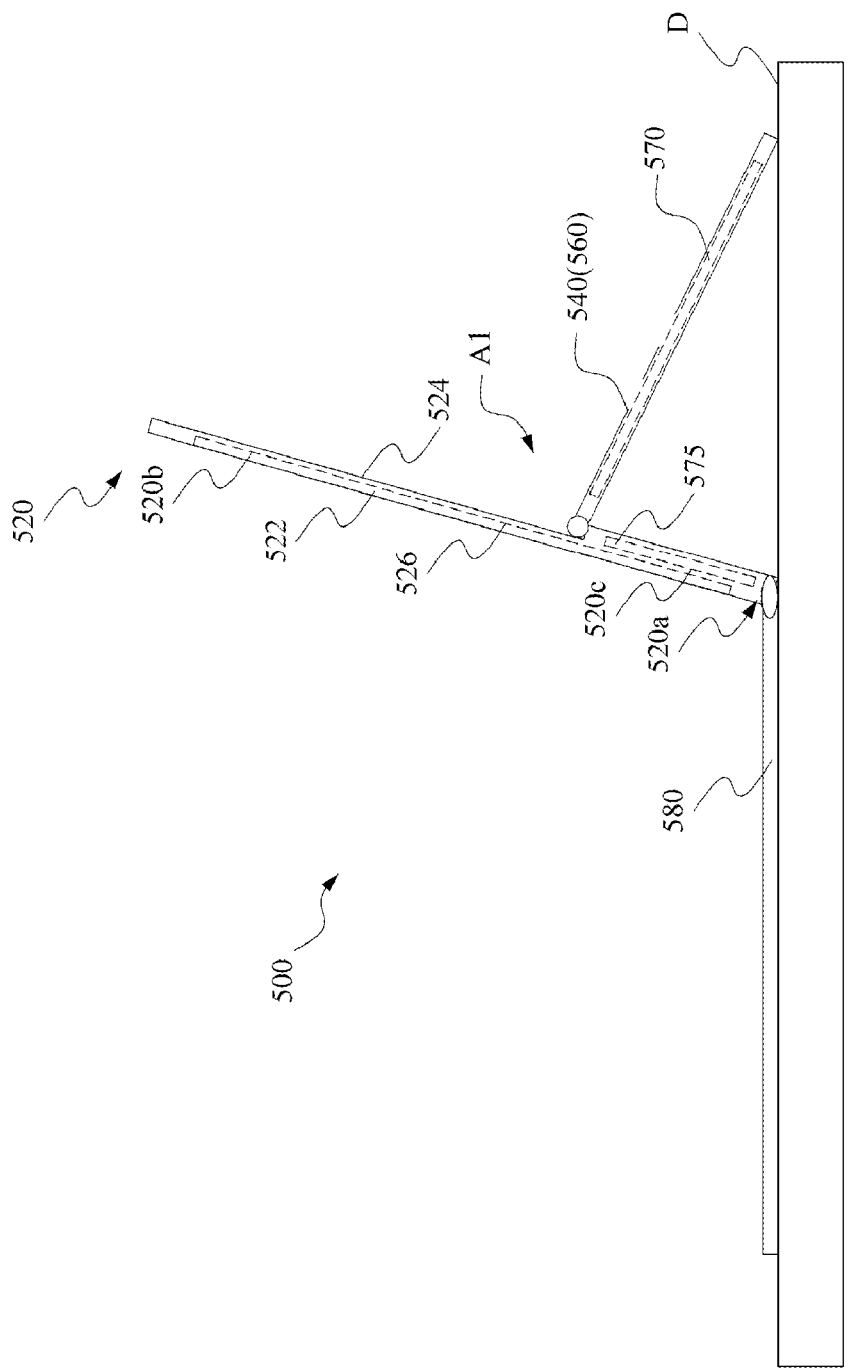
FIG. 5 and FIG. 6 are schematic diagrams of an unfolded state and a folded state of a foldable electronic device provided according to a third embodiment of the disclosure.
Figure 6:
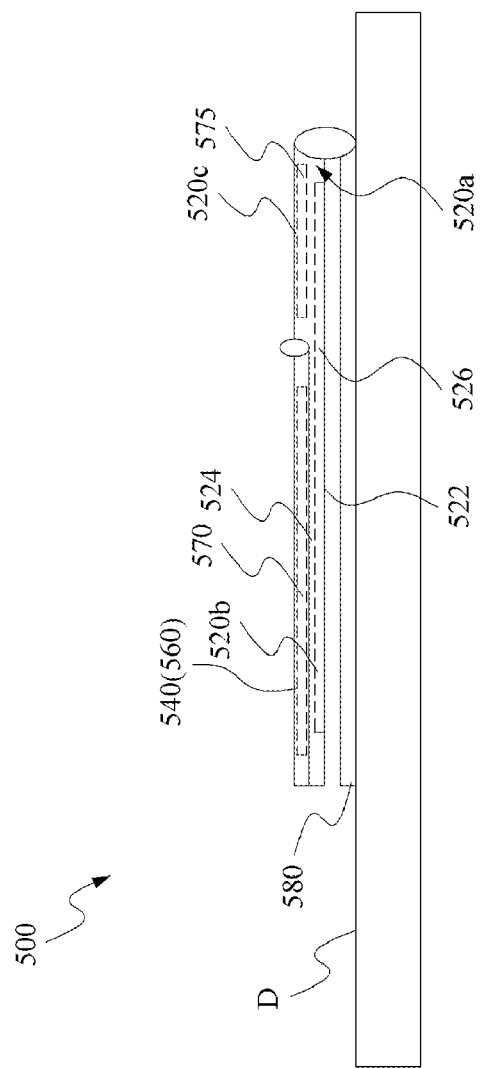

FIG. 5 and FIG. 6 are schematic diagrams of an unfolded state and a folded state of a foldable electronic device 500 provided according to a third embodiment of the disclosure.

A first body 520 of this embodiment includes a front surface 522 and a rear surface 524, and includes a screen module 526. The front surface 522 of the first body 520 is a surface of the screen module 526 used for displaying a picture. Similar to the first embodiment, the first body 520 of this embodiment includes an upper portion 520b and a lower portion 520c. However, a thickness of the upper portion 520b is less than that of the lower portion 520c.

A battery 575 is arranged in an extra thickness space of the lower portion 520c. A second body 540 is arranged at the rear surface 524 of the first body 520 as a support portion 560 to support the first body 520. The support portion 560 is pivotally connected to an intersection of the upper portion 520b and the lower portion 520c. The battery 575 supplies power to the screen module 526 of the first body 520 and the system 570 in the support portion 560.

In addition, in the foldable electronic device 100 of the first embodiment, the lower edge 120a of the first body 120 is designed to be selectively connected an input module 180. In this embodiment, a lower edge 520a of the first body 520 is pivotally connected to a base 580. An upper surface of the base 580 includes input elements such as a keyboard and a touchpad for a user to operate.

When the foldable electronic device 500 is in the folded state, the first body 520 covers the upper surface of the base, and the support portion 560 abuts against an area, corresponding to the upper portion 520b, of the rear surface 524 of the first body 520. Since an outer side surface of the support portion 560 is flush with the area, corresponding to the upper portion 520b, of the rear surface 524, the foldable electronic device 500 exhibits a simple appearance as a whole.

When the foldable electronic device 500 is in the unfolded state, the first body 520 is unfolded upward from the upper surface of the base, and the support portion 560 is unfolded outward from the rear surface 524 of the first body 520 to the supporting position, so that the first body 520 is in a specific oblique angle.

It is worth noting that in the first embodiment, a maximum angle at which the support portion 160 is unfolded outward with respect to the rear surface 124 of the first body 120 is less than 90 degrees. In the support portion 560 of this embodiment, the upper portion of the back surface 524 of the first body 520 is flipped outward to resist against the placement surface to support the first body 520, so that a maximum angle at which the support portion 560 of this embodiment is unfolded outward with respect to the back surface 524 of the first body 520 is greater than or equal to 90 degrees.

In one embodiment, the maximum angle at which the support portion 560 is unfolded outwardly is limited by an external structure of the lower portion 520c of the first body 520.

When the foldable electronic devices 100, 300, 500 of the disclosure are in use, the support portions are moved to the supporting positions, so that an open space A1 is formed between the support portion 160, 344, 560 and the first body 120, 320, 520, facilitating introduction of cold air into the system 170, 370, 570 for heat dissipation. This not only improves the heat dissipation ability of the system and reduces noise generated by a heat dissipation fan, but also helps improve the efficiency of the system 170, 370, 570.

The foregoing merely describes preferred embodiments of the disclosure and is not to limit the disclosure in any way. Any persons skilled in the art, without departing from the scope of the technical means of the disclosure, make any equivalent replacements or modification to the technical means and technical contents disclosed in the disclosure. The equivalent replacements or modifications are contents of the technical means of the disclosure and still fall within the scope of the disclosure.

What is claimed is:

1. A foldable electronic device, comprising:
   a first body, comprising a front surface and a rear surface; and
   a second body, arranged at the rear surface and comprising a support portion, wherein a system is arranged in the support portion; the support portion is used for being switched between a folded position and a supporting position; when the support portion is located at the folded position, the support portion abuts against the rear surface; and when the support portion is located at the supporting position, an open space is formed between the support portion and the rear surface, and
   wherein a lower edge of the first body is connected to an input module, and when the foldable electronic device is in a folded state, the first body is overlapped with the input module in a manner that the front surface faces downward,
   wherein the second body further comprises a connecting portion, and the connecting portion is detachably fixed at the rear surface; and the support portion is pivotally connected to the connecting portion, and
   wherein a battery is arranged in the connecting portion.

2. The foldable electronic device according to claim 1, wherein the system comprises a motherboard.

3. The foldable electronic device according to claim 1, wherein the connecting portion is detachably fixed to the rear surface in a magnetic attraction manner.

4. The foldable electronic device according to claim 1, wherein the first body comprises a screen module.

5. The foldable electronic device according to claim 1, wherein the first body comprises an upper portion and a lower portion; a thickness of the upper portion is greater than that of the lower portion.

6. The foldable electronic device according to claim 5, wherein the support portion is pivotally connected to an intersection of the upper portion and the lower portion; and
   when the support portion is located at the folded position, the support portion abuts against an area of the rear surface corresponding to the lower portion.

7. The foldable electronic device according to claim 1, wherein the first body comprises an upper portion and a lower portion; a thickness of the upper portion is less than that of the lower portion.

8. The foldable electronic device according to claim 7, wherein the support portion is pivotally connected to an intersection of the upper portion and the lower portion; and
   when the support portion is located at the folded position, the support portion abuts against an area of the rear surface corresponding to the upper portion.

9. A foldable electronic device, comprising:
   a first body, comprising a front surface and a rear surface; and
   a second body, arranged at the rear surface and comprising a support portion, wherein a system is arranged in the support portion; the support portion is used for being switched between a folded position and a supporting position; when the support portion is located at the folded position, the support portion abuts against the rear surface; and when the support portion is located at the supporting position, an open space is formed between the support portion and the rear surface, and
   wherein a lower edge of the first body is connected to an input module, and when the foldable electronic device is in a folded state, the first body is overlapped with the input module in a manner that the front surface faces downward,
   wherein the first body comprises an upper portion and a lower portion; a thickness of the upper portion is greater than that of the lower portion, and
   wherein a thickness difference of the upper portion and the lower portion is identical to a thickness of the support portion.

* * * * *